(12) United States Patent
Huang et al.

(10) Patent No.: US 7,779,970 B1
(45) Date of Patent: Aug. 24, 2010

(54) BRAKE ASSEMBLY AND A BRAKE SHOE THEREOF FOR A BICYCLE

(75) Inventors: Chin-Lai Huang, Hsinchu (TW); Chih-Hsiang Shen, Taichung County (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 12/469,817

(22) Filed: May 21, 2009

(51) Int. Cl.
*B62L 1/06* (2006.01)
(52) U.S. Cl. .................................. 188/24.12
(58) Field of Classification Search .... 188/24.11–24.22

See application file for complete search history.

(56) References Cited

U.S. PATENT DOCUMENTS

| | | | | |
|---|---|---|---|---|
| 5,545,982 | A * | 8/1996 | Vlakancic | 324/174 |
| 7,438,159 | B2 * | 10/2008 | Watarai | 188/24.12 |
| 2009/0178891 | A1 * | 7/2009 | Chen | 188/24.19 |

* cited by examiner

*Primary Examiner*—Christopher P Schwartz

(57) ABSTRACT

A brake assembly for braking a wheel of a bicycle includes left and right brake arms and left and right brake shoes. Each brake shoe includes a holder mounted to the respective brake arm, a pad unit mounted on the holder and having a friction surface that is brought to frictionally engage a rim side of a wheel rim of the wheel, and a magnetically attracting unit mounted on the holder for establishing a magnetic field such that, in the course of a braking action, the strength of the established magnetic field is gradually increased to be of a magnitude sufficient to generate a dragging force to decelerate the running speed of the wheel rim until the friction surface frictionally engages the rim side.

9 Claims, 3 Drawing Sheets

BRAKE ASSEMBLY AND A BRAKE SHOE THEREOF FOR A BICYCLE

BACKGROUND OF THE INVENTION

1. Field of the Invention

This invention relates to a brake assembly for a bicycle, more particularly to a bicycle brake assembly having brake shoes to frictionally engage a wheel rim for slowing down or stopping rotation of the wheel rim, and a brake shoe thereof.

2. Description of the Related Art

A conventional bicycle generally has a brake assembly that can grip a wheel rim in response to a rider/cyclist's braking operation. Such brake assembly includes a pair of brake arms movably mounted on a bicycle frame to bridge the wheel rim, and a pair of brake shoes respectively mounted on the brake arms for abutting against and frictionally engaging the rim for slowing down or stopping the bicycle. However, application of a violent braking force to a wheel rotating at a high speed would result in locking of the wheel, which may cause skidding or even turning over of the bicycle.

SUMMARY OF THE INVENTION

An object of the present invention is to provide a bicycle brake assembly which is operable to generate a resistance to a wheel rim before a brake shoe frictionally engages the wheel rim so as to brake the wheel rim in a stable and controllable manner.

According to this invention, the brake assembly includes left and right brake arms and left and right brake shoes.

Each of the left and right brake arms includes a pivot end which is adapted to be pivotally mounted on a frame body of a bicycle, and a mount segment extending from the pivot end and outboard of a wheel rim of a wheel such that, by virtue of a braking action, the mount segments are moved from a normal position to a mechanically braking position, where the mount segments are close to the wheel rim.

Each of the left and right brake shoes includes a holder, a pad unit, and a magnetically attractive unit. The holder is mounted to the mount segment, and extends to terminate at an anchored end. The anchored end is elongated to form an anchored region that is disposed to be spaced apart from a rim side of the wheel rim. The pad unit is mounted on the anchored region, and has a friction surface that is disposed to be spaced apart from the rim side when the mount segment is in the normal position, and that is brought to frictionally engage the rim side, thereby effecting a braking action on the wheel rim when the mount segment is in the mechanically braking position. The magnetically attracting unit is mounted on the anchored region for establishing a magnetic field, and is disposed to be spaced apart from the rim side in the normal position such that, in the course of the braking action, the strength of the established magnetic field is gradually increased to be of a magnitude sufficient to generate a dragging force to decelerate the running speed of the wheel rim until the mechanically braking position is reached.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
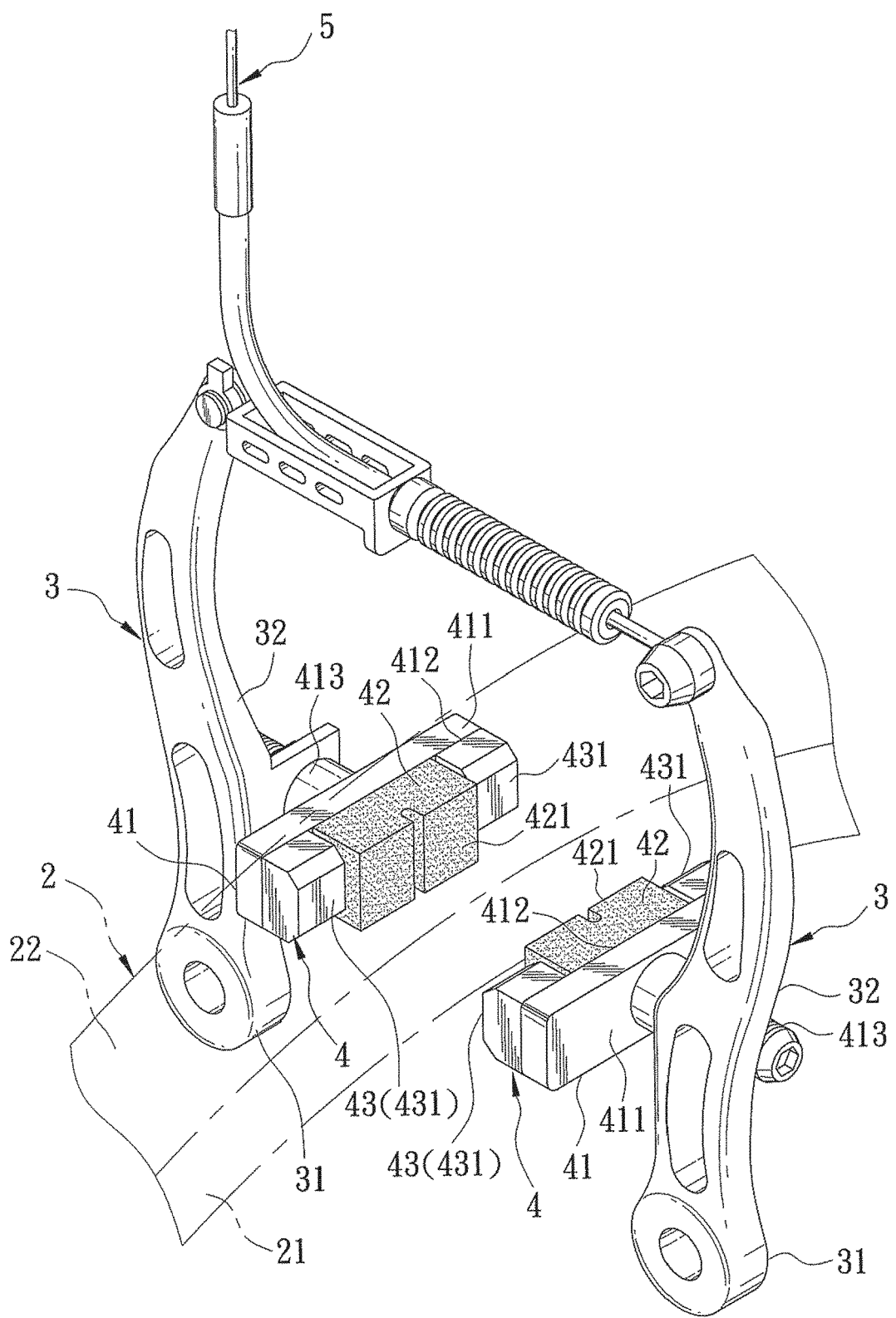
FIG. 1 is a perspective view of the preferred embodiment of a brake assembly according to this invention.
Figure 2:
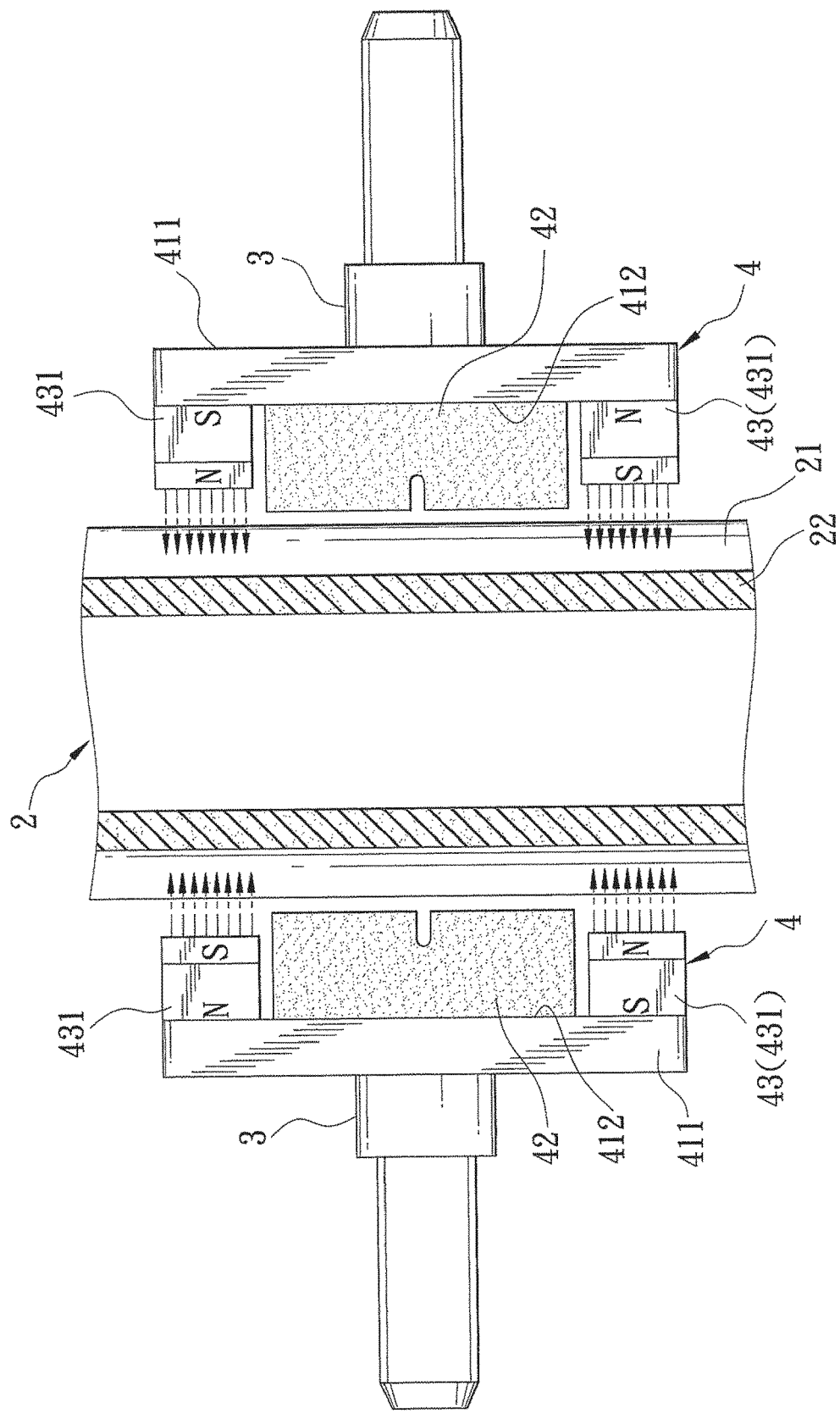
FIG. 2 is a schematic top view of the brake assembly of the preferred embodiment.
Figure 3:
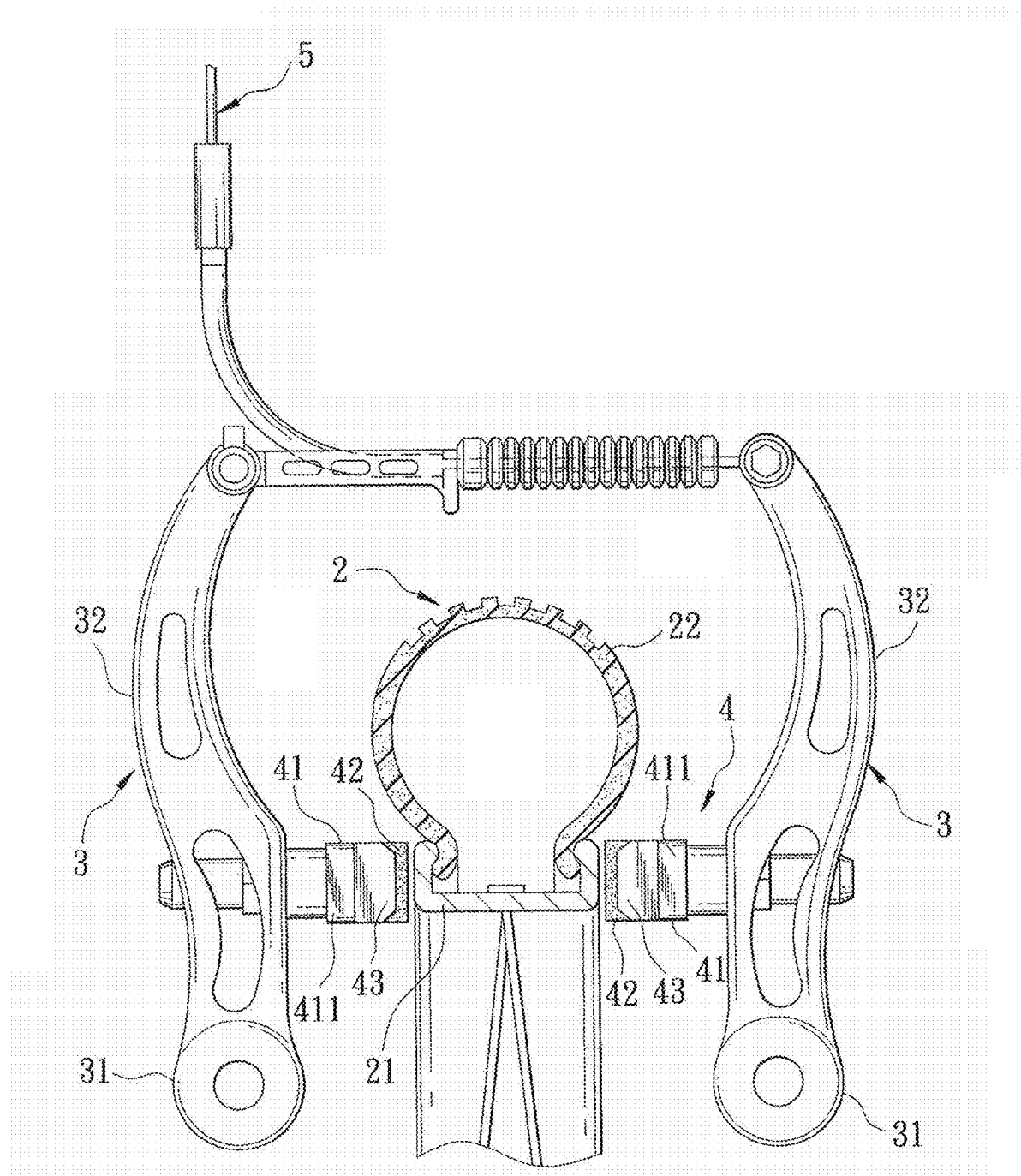
FIG. 3 is a schematic front view of the brake assembly of the preferred embodiment.

Referring to FIGS. 1 to 3, the preferred embodiment of a brake assembly according to the present invention is adapted for use with a brake cable 5 for braking a wheel 2 of a bicycle (not shown). The wheel 2 generally includes a wheel rim 21 made from a magnetically attractive material, and a tire 22 surrounding the wheel rim 21. The brake assembly is shown to comprise left and right brake arms 3 and left and right brake shoes 4.

The left brake arm 3 includes a left pivot end 31 and a left mount segment 32. The right brake arm 3 includes a right pivot end 31 and a right mount segment 32. The left and right pivot ends 31 are adapted to be pivotally mounted on a fork (not shown) of the bicycle about left and right pivot axes, respectively, which are transverse to an axial direction of a wheel axis of the wheel 2. The left and right mount segments 32 respectively extend from the left and right pivot ends 31 in an upright direction and outboard of the wheel rim 21. Thus, by virtue of a braking action of the brake cable 5, the left and right mount segments 32 are moved from a normal position, where the left and right mount segments 32 are remote from the wheel rim 21, to a mechanically braking position, where the left and right mount segments 32 are close to the wheel rim 21.

The left brake shoe 4 includes a left holder 41, a left pad unit 42, and a left magnetically attractive unit 43. The right brake shoe 4 includes a right holder 41, a right pad unit 42, and a right magnetically attractive unit 43.

The left and right holders 41 are respectively mounted to the left and right mount segments 32, and respectively have left and right studs 413 that extend along left and right lengthwise lines to terminate at left and right anchored ends 411, respectively. The left and right anchored ends 411 are elongated in a direction transverse to the upright and axial directions, and respectively form left and right anchored regions 412 that are disposed to be respectively spaced apart from left and right rim sides of the wheel rim 21 in the axial direction.

The left and right pad units 42 are made from rubber, and are respectively mounted on the left and right anchored regions 412. The left and right pad units 42 respectively have left and right friction surfaces 421 that are disposed to be respectively spaced apart from the left and right rim sides of the wheel rim 21 when the left and right mount segments 32 are in the normal position, and that are brought to frictionally engage the left and right rim sides, respectively, thereby effecting a braking action on the wheel rim 21 when the left and right mount segments 32 are in the mechanically braking position.

The left and right magnetically attracting units 43 are respectively mounted on the left and right anchored regions 412. Each of the left and right magnetically attracting units 43 includes first and second magnet blocks 431 in the form of permanent magnets which are disposed at two opposite sides of a respective one of the left and right pad units 42, and which have opposite magnetic poles relative to the respective one of the left and right pad units 42 for establishing magnetic field. The first magnet blocks 431 of the left and right magnetically attracting units 43 confront each other relative to the wheel rim 21 and have opposite magnetic poles, and the second magnet blocks 431 of the left and right magnetically attracting units 43 confront each other relative to the wheel rim 21 and have opposite magnetic poles. In addition, each of the first and second magnet blocks 431 has a thickness which is smaller than that of the respective one of the left and right pad units 42 such that the strength of the established magnetic field is insufficient to generate a dragging force on running of the wheel rim 21 before a braking action is effected.

In the course of the braking action, the strength of the established magnetic field is gradually increased to be of a magnitude sufficient to generate a dragging force to decelerate the running speed of the wheel rim 21 until the mechanically braking position is reached. As illustrated, before the left and right friction surfaces 421 frictionally engage the wheel rim 21, the magnetic field is established to generate the dragging force so as to decelerate the rotating speed of the wheel rim 21. Moreover, the higher the rotating speed of the wheel rim 21, the greater will be the dragging force. Hence, a steady and safer braking effect can be achieved, and the service life of the pad units 42 can be prolonged.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A brake assembly for braking a wheel of a bicycle, the bicycle including a frame body, the wheel having a magnetically attractive wheel rim which surrounds a wheel axis in an axial direction and which has left and right rim sides, said brake assembly comprising:
    left and right brake arms respectively including
        left and right pivot ends adapted to be pivotally mounted on the frame body about left and right pivot axes, respectively, which are transverse to the axial direction, and
        left and right mount segments which respectively extend from said left and right pivot ends in an upright direction and outboard of the wheel rim such that, by virtue of a braking action, said left and right mount segments are moved from a normal position, where said left and right mount segments are remote from the wheel rim, to a mechanically braking position, where said left and right mount segments are close to the wheel rim;
    left and right holders respectively mounted to said left and right mount segments, and extending respectively along left and right lengthwise lines to terminate at left and right anchored ends, respectively, said left and right anchored ends being elongated in a direction transverse to the upright and axial directions, and respectively forming left and right anchored regions that are disposed to be respectively spaced apart from the left and right rim sides in the axial direction;
    left and right pad units which are respectively mounted on said left and right anchored regions, and which respectively have left and right friction surfaces that are disposed to be respectively spaced apart from the left and right rim sides when said left and right mount segments are in the normal position, and that are brought to frictionally engage the left and right rim sides, respectively, thereby effecting a braking action on the wheel rim when said left and right mount segments are in the mechanically braking position; and
    left and right magnetically attracting units respectively mounted on said left and right anchored regions, confronting each other in the axial direction for establishing a magnetic field, and disposed to be respectively spaced apart from the left and right rim sides in the normal position such that strength of the established magnetic field is insufficient to generate a dragging force on running of the wheel rim, and such that, in the course of the braking action, the strength of the established magnetic field is gradually increased to be of a magnitude sufficient to generate a dragging force to decelerate the running speed of the wheel rim until the mechanically braking position is reached.

2. The brake assembly according to claim 1, wherein each of said left and right magnetically attracting units includes first and second magnet blocks which are disposed at two opposite sides of a respective one of said left and right pad units.

3. The brake assembly according to claim 2, wherein said first magnet blocks of said left and right magnetically attracting units confront each other relative to the wheel rim and have opposite magnetic poles, said second magnet blocks of said left and right magnetically attracting units confront each other relative to the wheel rim and have opposite magnetic poles.

4. The brake assembly according to claim 3, wherein said first and second magnet blocks of each of said left and right magnetically attracting units have opposite magnetic poles relative to the respective one of said left and right pad units.

5. The brake assembly according to claim 2, wherein each of said first and second magnet blocks has a thickness which is smaller than that of the respective one of said left and right pad units.

6. A brake shoe adapted to be mounted on a brake arm of a bicycle which is movable by virtue of a braking action from a normal position, where the brake arm is remote from a wheel rim of a wheel, to a mechanically braking position, where the brake arm is close to the wheel rim, said brake shoe comprising:
    a holder adapted to be mounted to the brake arm, and having an anchored end which forms an anchored region that is disposed to be spaced apart from a rim side of the wheel rim;
    a pad unit which is mounted on said anchored region, and which has a friction surface that is disposed to be spaced apart from the rim side when the brake arm is in the normal position, and that is brought to frictionally engage the rim side, thereby effecting a braking action on the wheel rim when the brake arm is in the mechanically braking position; and
    a magnetically attracting unit mounted on said anchored region for establishing a magnetic field, and disposed to be spaced apart from the rim side in the normal position such that strength of the established magnetic field is insufficient to generate a dragging force on running of the wheel rim, and such that, in the course of the braking action, the strength of the established magnetic field is gradually increased to be of a magnitude sufficient to generate a dragging force to decelerate the running speed of the wheel rim until the mechanically braking position is reached.

7. The brake shoe according to claim 6, wherein said magnetically attracting unit includes first and second magnet blocks which are disposed at two opposite sides of said pad unit.

8. The brake shoe according to claim 7, wherein each of said first and second magnet blocks has a thickness which is smaller than that of said pad units.

9. The brake shoe according to claim 7, wherein said first and second magnet blocks have opposite magnetic poles relative to said pad units.

* * * * *